United States Patent
Kumar et al.

(10) Patent No.: US 10,805,833 B2
(45) Date of Patent: Oct. 13, 2020

(54) METHOD OF HANDLING CONTROL PLANE DATA IN A WIRELESS NETWORK

(71) Applicant: Samsung Electronics Co., Ltd., Suwon-si, Gyeonggi-do (KR)

(72) Inventors: Lalith Kumar, Bangalore (IN); Alok Kumar Jangid, Bangalore (IN); Kailash Kumar Jha, Bangalore (IN); Sunghoon Kim, Seoul (KR); Danish Ehsan Hashmi, Bangalore (IN); Samiran Bhowmik, Bangalore (IN); Ramesh Chandra Vuppala, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/315,286

(22) PCT Filed: Jul. 5, 2017

(86) PCT No.: PCT/KR2017/007180
§ 371 (c)(1),
(2) Date: Jan. 4, 2019

(87) PCT Pub. No.: WO2018/008977
PCT Pub. Date: Jan. 11, 2018

(65) Prior Publication Data
US 2020/0092747 A1    Mar. 19, 2020

(30) Foreign Application Priority Data

Jul. 5, 2016   (IN) .............................. 201641023071
Aug. 19, 2016  (IN) .............................. 201641028365
(Continued)

(51) Int. Cl.
*H04W 28/02*   (2009.01)
*H04W 76/18*   (2018.01)
*H04W 4/70*    (2018.01)

(52) U.S. Cl.
CPC ....... *H04W 28/0289* (2013.01); *H04W 76/18* (2018.02); *H04W 4/70* (2018.02)

(58) Field of Classification Search
CPC .... H04W 28/0289; H04W 76/18; H04W 4/70
(Continued)

(56) References Cited

U.S. PATENT DOCUMENTS 9,055,477 B2     6/2015  Gupta
2012/0002545 A1* 1/2012  Watfa ...................... H04W 4/90
                                                370/235
(Continued)

FOREIGN PATENT DOCUMENTS

CN    103857005 A   6/2014
EP      2824981 A1  1/2015
(Continued)

OTHER PUBLICATIONS

ISA/KR, International Search Report and Written Opinion of the International Searching Authority for International Application No. PCT/KR2017/007180, dated Oct. 30, 2017, 12 pages.
(Continued)

*Primary Examiner* — Obaidul Huq

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

(Continued)

The various embodiments of the present invention disclose a method of handling control plane data in a wireless network, the method comprises sending, by a user entity (UE), a non-access stratum (NAS) message along with an indication data to a mobility management (MM) core network entity. The MM core network entity processes the received NAS message and the indication data. The MM core network entity determines status of network congestion upon processing the processed NAS message. Sending, by the MM core network entity, a response to the UE based on at least one of the processed indication data and the determined network congestion.

20 Claims, 10 Drawing Sheets

(30) Foreign Application Priority Data

Oct. 3, 2016 (IN) .............................. 201641033734
Jul. 3, 2017 (IN) .............................. 201641023071

(58) Field of Classification Search
USPC ........................................ 370/310, 328, 329
See application file for complete search history.

(56) References Cited

U.S. PATENT DOCUMENTS

| | | | |
|---|---|---|---|
| 2014/0022904 A1* | 1/2014 | Ahmad | H04W 28/0289 370/235 |
| 2014/0254367 A1 | 9/2014 | Jeong et al. | |
| 2015/0092688 A1 | 4/2015 | Jeong et al. | |
| 2016/0157253 A1 | 6/2016 | Yamine et al. | |

FOREIGN PATENT DOCUMENTS

| | | |
|---|---|---|
| KR | 10-2013-0103428 A | 9/2013 |
| WO | 2011156264 A2 | 12/2011 |

OTHER PUBLICATIONS

Catt, "Discussion on issues related to the NAS MO configuration for exceptional reporting", 3GPP TSG CT WG1 Meeting #97, May 23-27, 2016, C1-162578, 4 pages.

Supplementary European Search Report dated Jan. 23, 2020 in connection with European Patent Application No. EP 17 82 4533, 9 pages.

* cited by examiner

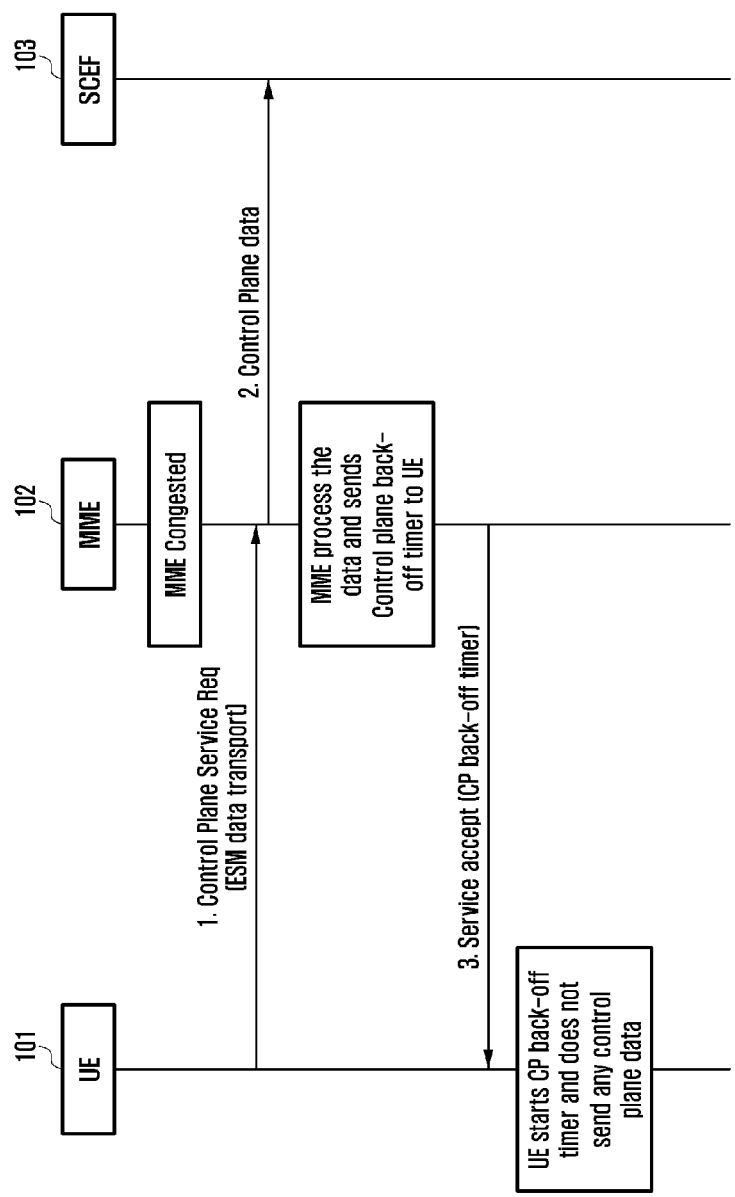

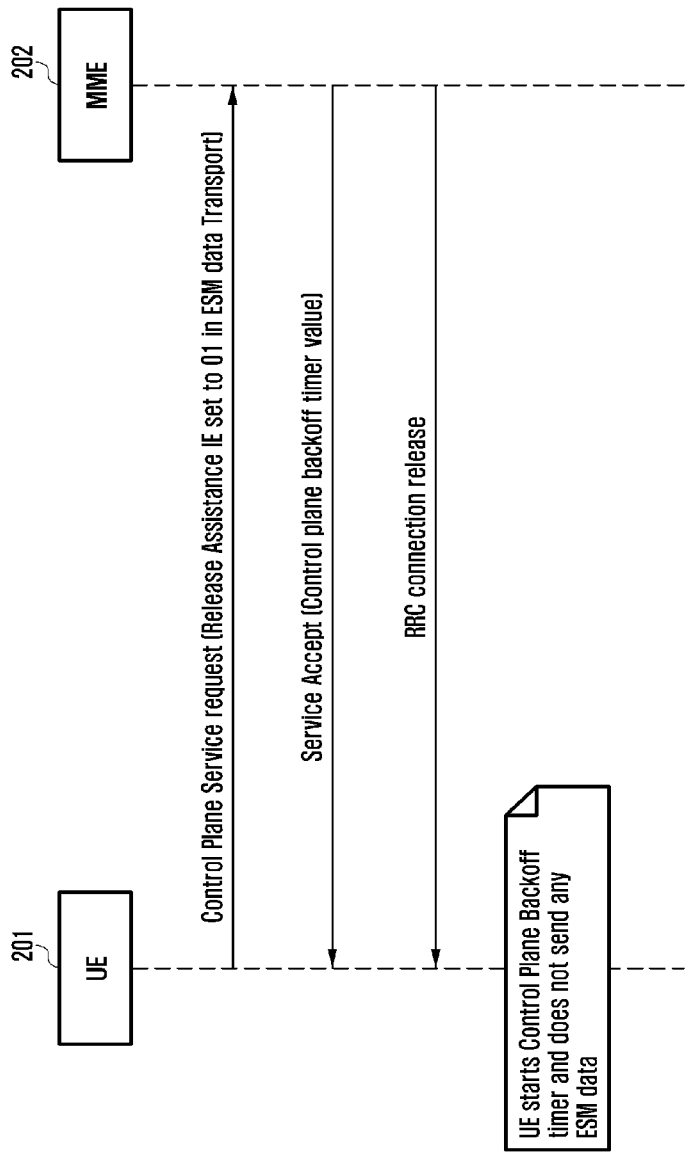

[Fig. 3]
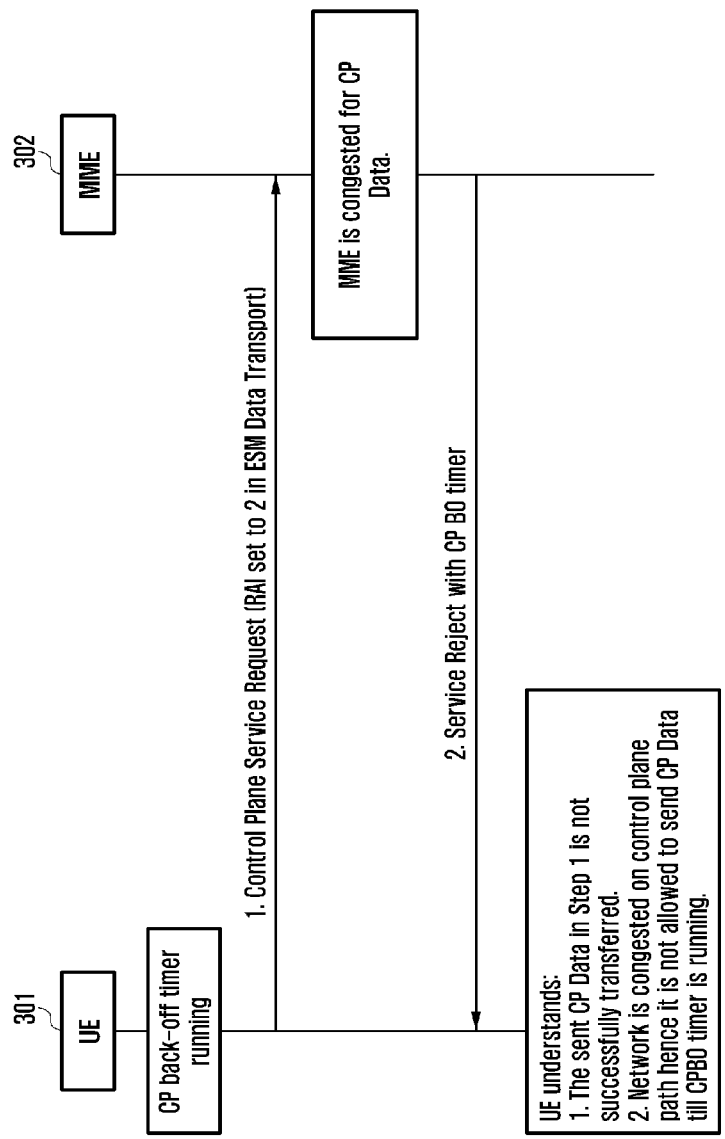

[Fig. 4]
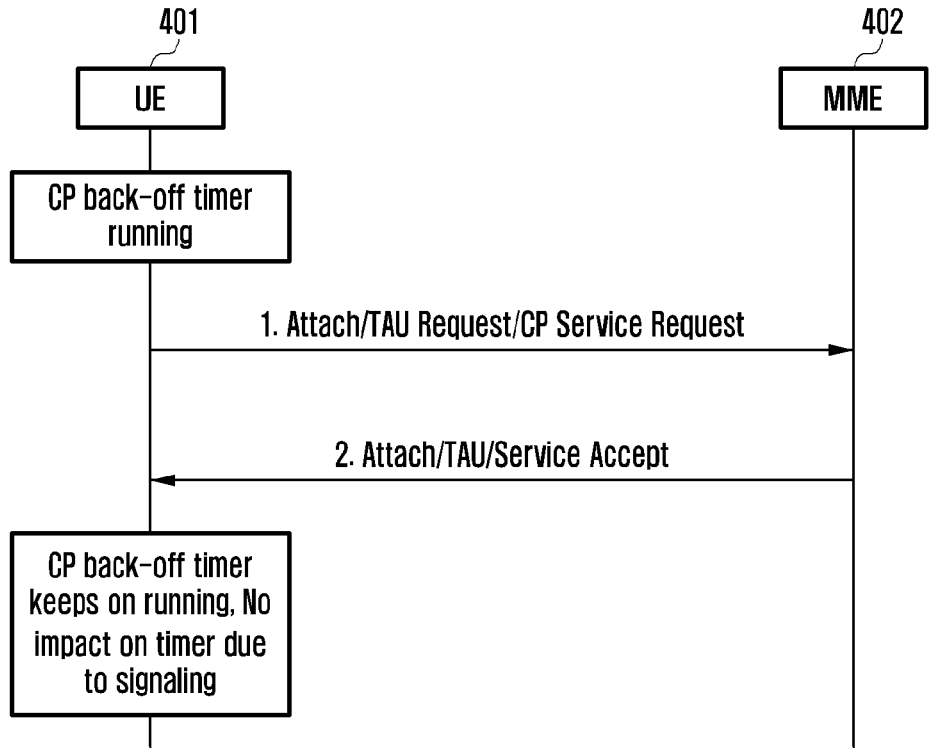
[Fig. 5]
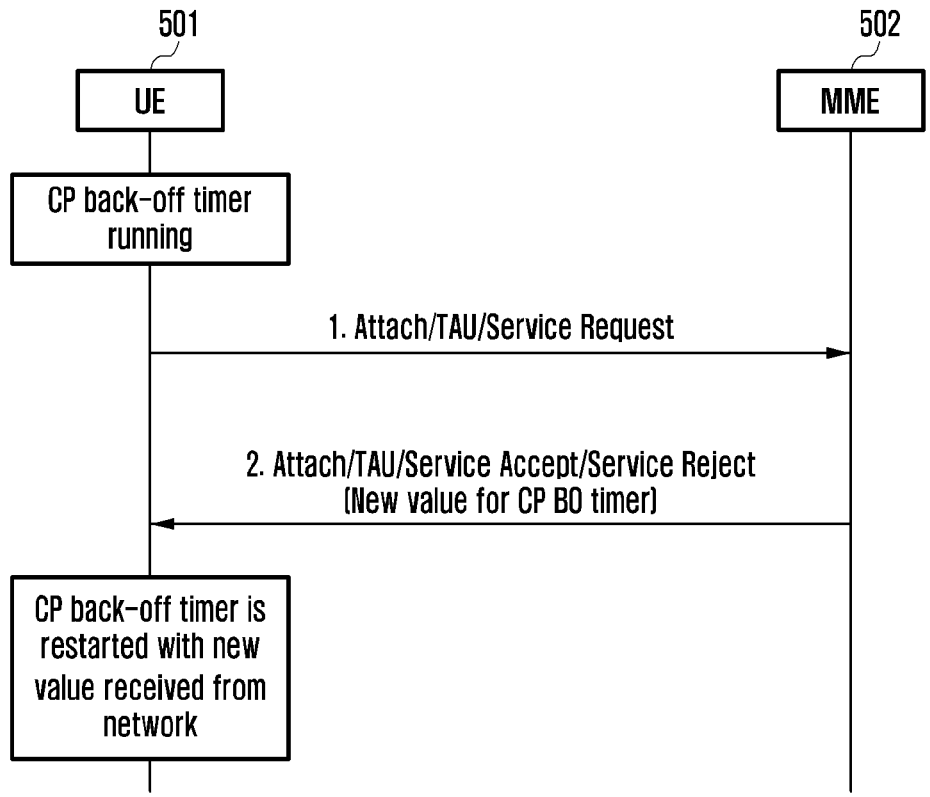

[Fig. 6]
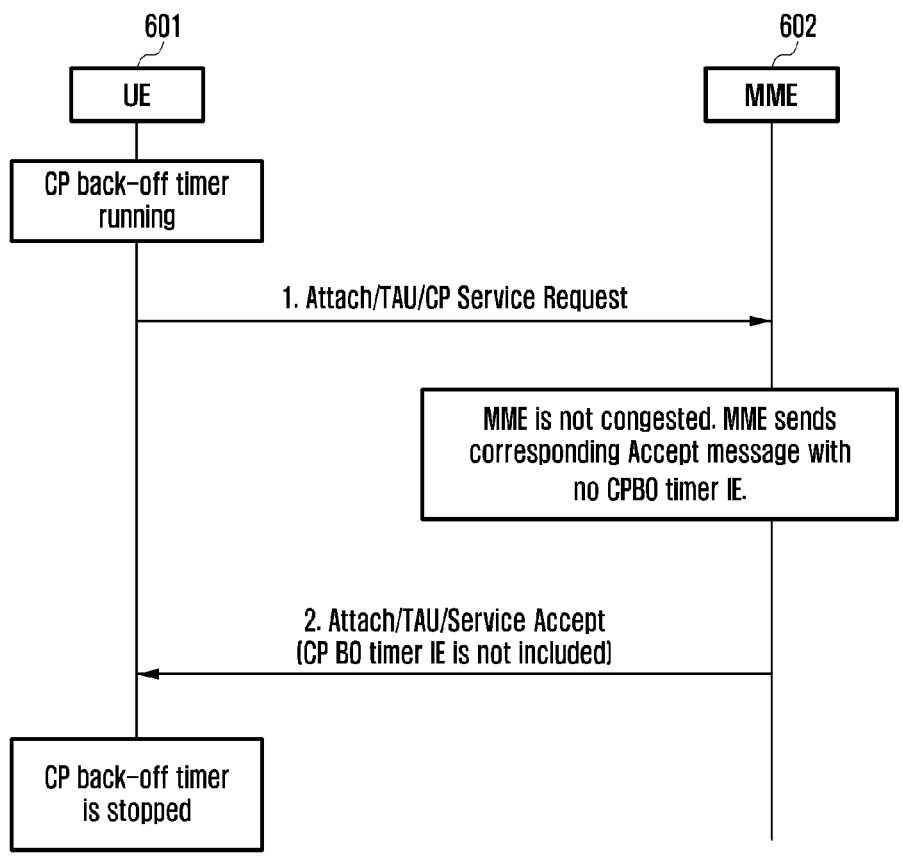

[Fig. 7a]
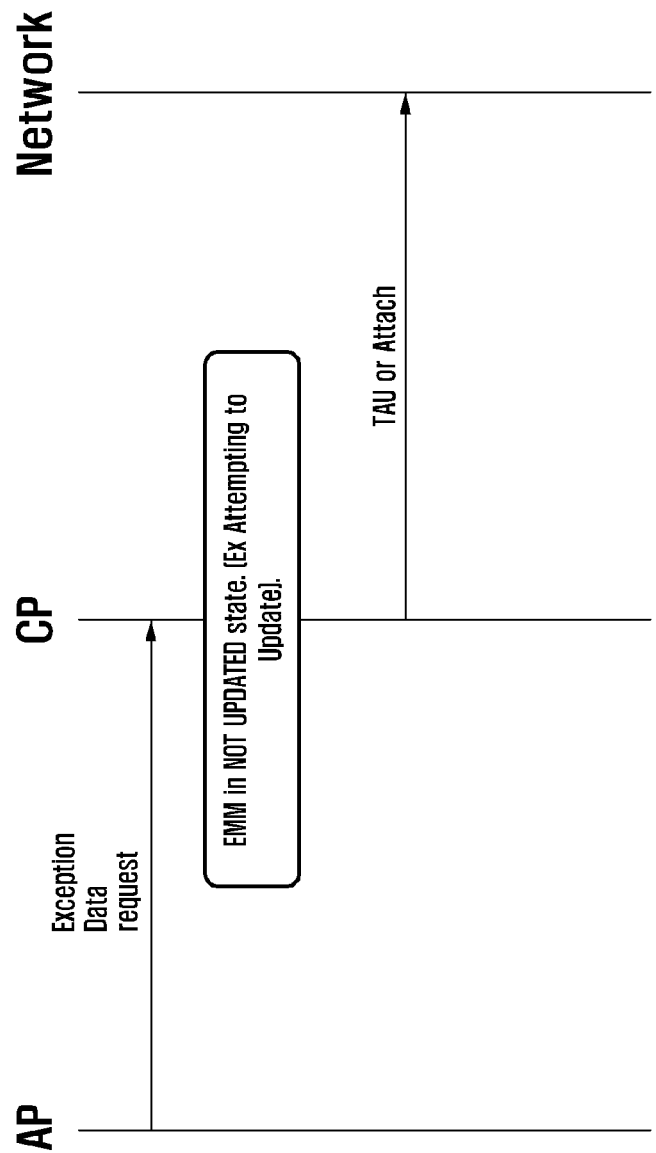

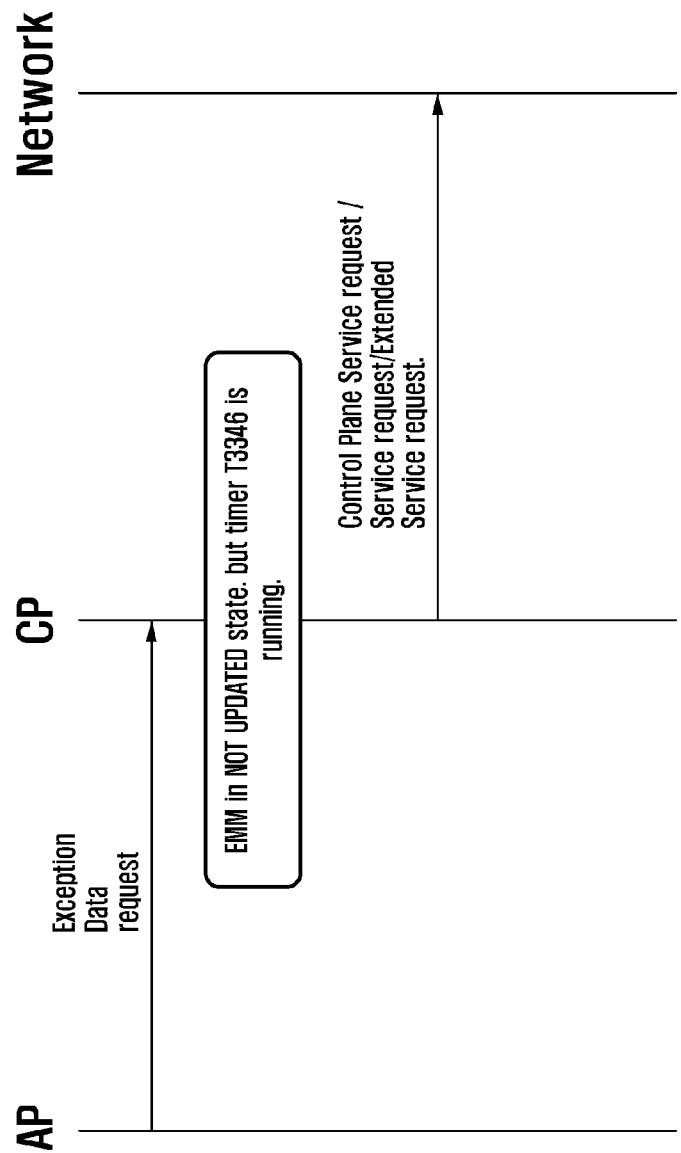

[Fig. 8]
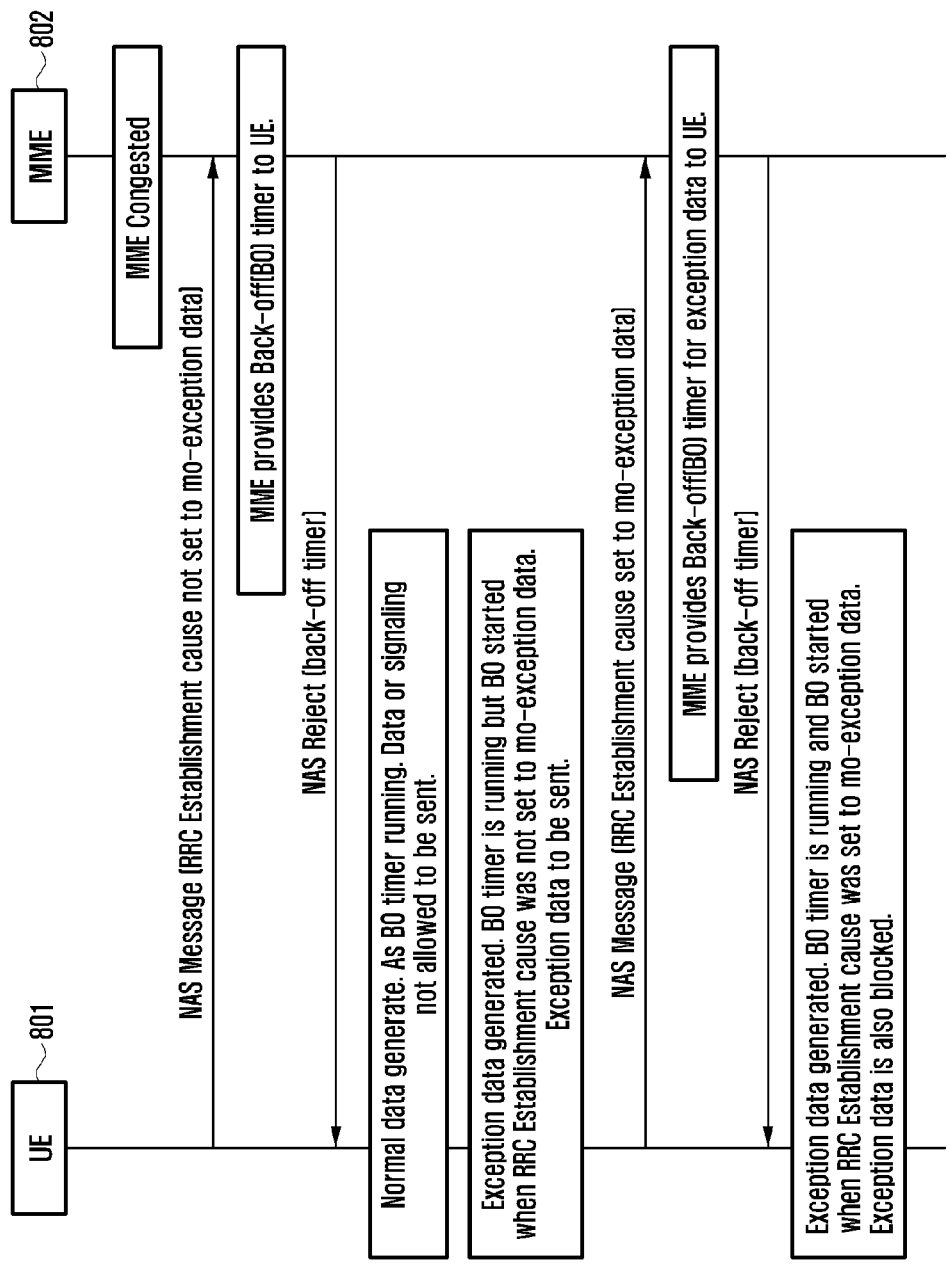

[Fig. 9]
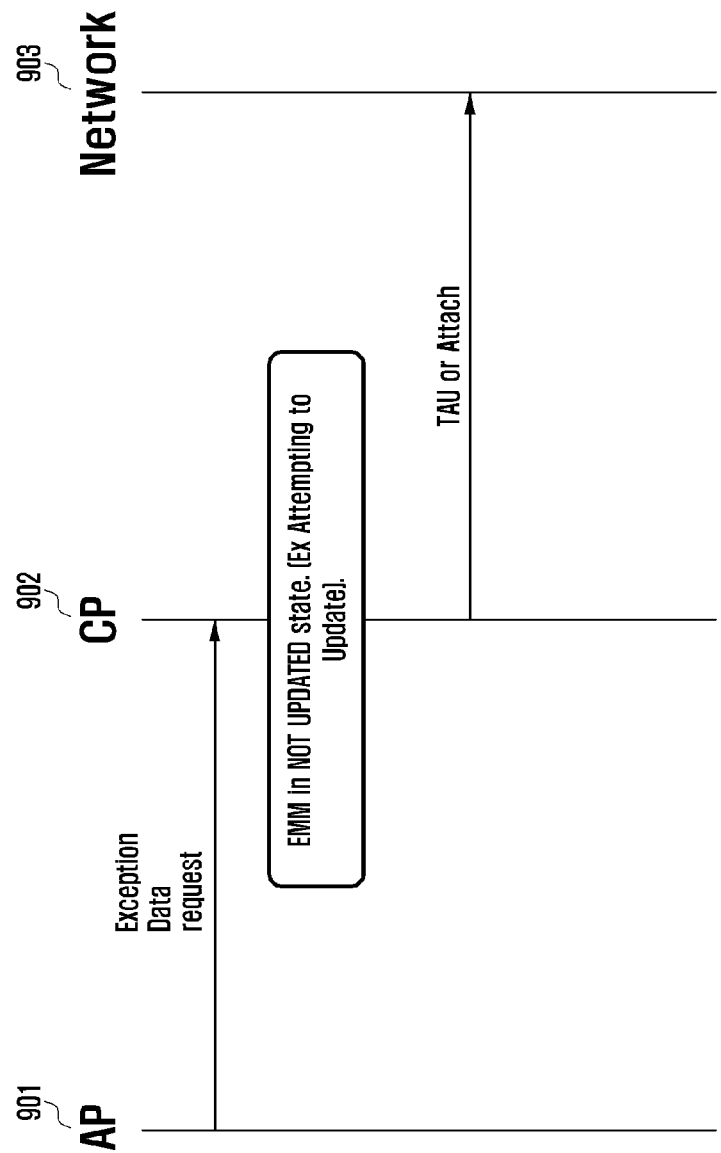

[Fig. 10]
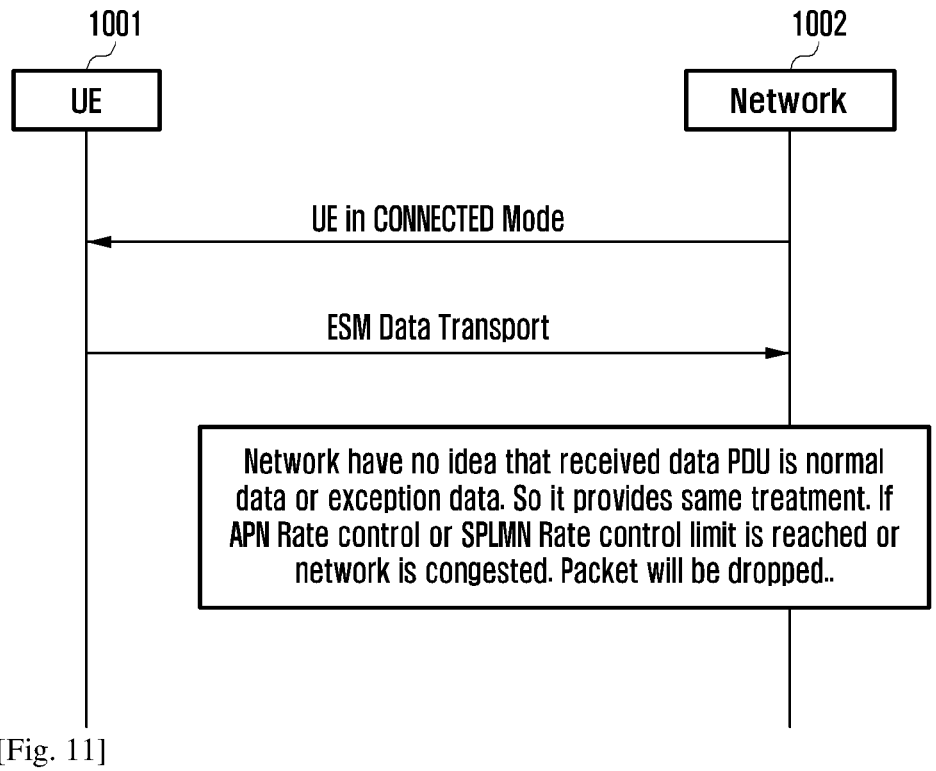
[Fig. 11]
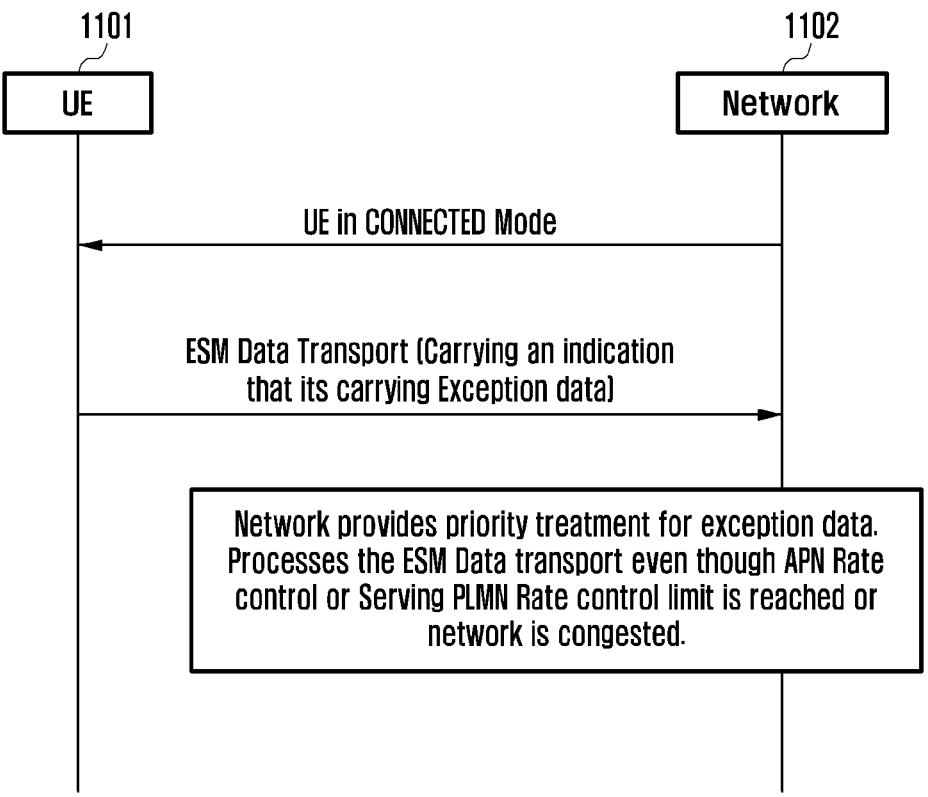

METHOD OF HANDLING CONTROL PLANE DATA IN A WIRELESS NETWORK

CROSS-REFERENCE TO RELATED APPLICATIONS

This application is a 371 National Stage of International Application No. PCT/KR2017/007180, filed Jul. 5, 2017, which claims priority to Indian Patent Application No. 201641023071, filed Jul. 5, 2016, Indian Patent Application No. 201641028365, filed Aug. 19, 2016, Indian Patent Application No. 201641033734, filed Oct. 3, 2016, and Indian Patent Application No. 201641023071, filed Jul. 3, 2017, the disclosures of which are herein incorporated by reference in their entirety.

BACKGROUND

1. Field

The present invention generally relates to wireless communication and more particularly, to a method and system for handling control plane data in a wireless network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As part of Control Plane Cellular Internet of Things (CP CIOT) optimization, the serving rate Public Land Mobile Network (PLMN) and APN rate control has been introduced to protect its Mobility Management Entity (MME). And also the signaling radio bearers in the Evolved Universal Terrestrial Radio Access Network (E-UTRAN) from load generated by Non-Access-Stratum (NAS) messages with user data over control plane. The User Equipment (UE) should be able to send exception reports even in case the rate control limit has been reached.

The UE sends control plane data using ESM data transport message piggybacked on control plane service request message to core network mobility management entity (MME). If MME is congested for control plane (CP) data then the MME accepts the received ESM data transport message, forwards the same to Service Capability Exposure Function (SCEF) or PDN GW and MME sends CP data back-off (BO) timer to UE along with a service accept message if UE had indicated the support of CP Data BO timer. UE starts CP back-off timer and does not send subsequent data over control plane until CP BO timer is running. The issue with this prior art procedure is that whenever MME receives the control plane data it is always forced to accept and process it even though MME is congested. Further the accepted CP Data can add on to more processing when it gets forwarded to destination by MME. The destination may generate acknowledgement packet on reception of CP Data and due to this MME is again forced to process this extra acknowledgement packet under congestion situation. This forced processing of data on MME creates an extra load and will start using the resources secured for any critical purposes like emergency services or exception data.

If UE is running Control Plane data back off timer that means network had indicated to UE that its congested on control plane data path and UE is not expected to send the CP Data till CP Data BO timer is running. Meanwhile MME also runs the same timer for that particular UE (subscriber), so that next time if UE sends any request then MME can reject it by including the CPBO timer. However when UE sends the next request if MME congestion is alleviated then how UE is synchronized with new congestion alleviated situation at MME is not defined currently.

If the User Equipment (UE) is attempting to send exception data, then UE will not be able to send the exception data to the network due to various reasons such as network congestion, UE abnormality. If the UE has received indications from the network that its Packet Switched (PS) domain or control plane path is congested, then UE will not be able to send the exception data to the network, as the PS domain back-off timer or CP back off timer will be running.

The UE initiates TAU or service request and if the MME is overloaded it may reject the TAU request or service request from the UE with back-off timer. Currently, the UE shall not initiate any NAS signaling or data to the MME for the duration of the MM back-off timer. Hence resources cannot be requested to network to send exception reports which are of critical nature.

SUMMARY

Whenever UE wants to send NAS signaling for exception data in IDLE mode it will set the RRC establishment cause to mo-exception data and establish RRC connection. With this information network will prioritize the exception data packet and will process even if network is in congested state and APN or SPLMN Rate control value is reached. However if UE is already in connected mode and had established RRC connection not due to exception data and now if an exception data packet is sent over control plane or user plane then there is a risk of network (SCEF/MME/PDN GW) dropping that packet as network has no knowledge that it's an exception data. Thus 3GPP system will end up dropping the critical exception data and can have serious consequences to the user.

Thus, there is a need for a method of handling control plane data especially exception data that is critical in a wireless network.

The various embodiments of the present invention disclose a method of handling control plane data in a wireless network. According to an embodiment of the present invention, a method comprises sending, by a user entity (UE), a non-access stratum (NAS) message along with an indication data to a mobility management (MM) core network entity. The MM core network entity processes the received NAS message and the indication data. The MM core network entity determines status of network congestion upon processing the processed NAS message. Sending, by the MM core network entity, a response to the UE based on at least one of the processed indication data and the determined network congestion.

According to an embodiment of the present invention, the current invention utilizes the indication provided by UE in Release assistance Indication IE as part of ESM Data Transport message to MME. 3GPP specification has defined release assistance indication information elements (IE) in ESM data transport message. Here EPS is evolved packet system. As per the Rel-14 of 3GPP specification the Release assistance indication IE is defined to include only 2 values by UE: One of the values for Release assistance indication value is 2 i.e. "only a single downlink data transmission (e.g. acknowledgement or response to uplink data) and no further uplink data transmission subsequent to the uplink data transmission is expected". This indicates to MME that if it accepts the incoming CP Data packet then there will also be one more acknowledgement packet it will have to process so till the duration of one more downlink packet (e.g. acknowledgement) MME is expected to not release the resources (RRC Connection) even in the congestion situation. Thus MME can decide to reject the request by providing SERVICE Reject message to UE along with CPBO timer. When Service Reject is received this identifies to UE that sent uplink data packet is not successfully transferred and if required UE will have to retransfer it and it cannot send any more CP Data packets till received CPBO timer expires.

If value 2 is not set in RAI then other value possible is "1". i.e "no further uplink or downlink data transmission is expected" which indicates to MME that this is last packet UE wants to send and after this MME can release the resources (RRC connection) for the UE. As data packet is already reached till MME and its last packet to be processed MME will decide to process this packet and send Service Accept to UE along with CP Back off timer. When UE receives Service Accept message UE identifies that sent CP Data packet is successfully transferred but MME is congested and thus UE will not send any more CP Data packets in future till CP Data BO timer is running.

According to an embodiment of the present invention, if UE sends any NAS message like control plane service request (due to paging or mo signaling or mo data or SMS etc) or TAU while CPBO timer is running on UE side which also means that there will be CPBO timer running on MME side for the same UE. If MME control plane data congestion situation is alleviated and decides to accept NAS message then MME shall provide corresponding NAS Accept message (like Service Accept or TAU Accept) without including CPBO timer IE to UE. Now as CPBO timer IE is not included UE shall stop the running CPBO timer on its sides. This is how congestion alleviated situation at MME can be synchronized with UE.

According to an embodiment of the present invention, the method further comprises identifying a first control plane (CP) back-off timer is in running state. The UE sends the NAS message to the MM core network entity during the running state of the first CP back-off timer. The MME then processes the received NAS message. Sending by the MM core network entity, one of an acceptance message and reject message for the processed NAS message along with a second CP back-off timer to the UE in case of network congestion. The UE stops the first CP back-off timer upon receipt of the second CP back-off time. The second CP back-off timer is started at the UE once the first CP back-off timer is stopped.

According to an embodiment of the present invention, the method further comprises identifying, by the UE a back-off timer is in running state. Receiving by the UE, an information about occurrence of an exceptional event during the running state of the first back-off timer. The UE attempts to send the NAS message to the MM core network entity upon receiving the information about occurrence of an exceptional event even if the back-off timer is in running state.

According to an embodiment of the present invention, If UE is trying to send exception data i.e. RRC establishment cause was set to mo-exception data then in general congestion situation network is expected to process and accept such data but if network is too much congested and not in a situation to process even exception data then to protect network, network can provide a back-off timer to UE. Under such situation if back-off timer is received by UE then UE shall not try to send even exception data till the latest received CPBO timer is running. i.e UE whenever it has exception data to be sent it checks if back off timer is running and if the back-off timer was not received from network when RRC establishment cause was set to mo-exception data only then it is allowed to initiate NAS signaling for exception data.

According to an embodiment of the present invention, the method further comprises identifying, by the UE, a control plane back-off timer is in running state. The UE attempts to stop the control plane back-off timer upon occurring of one of the UE entering EMM_DEREGISTERED state and UE performing PLMN change except EPLMN.

According to an embodiment of the present invention, the method further comprises identifying, by the UE, a back-off timer is in running state and UE had not started the first back-off timer when a NAS message was sent due to an exception event and in response network provided the back-off timer. Receiving by the UE, an information about occurrence of an exceptional event during the running state of the first back-off timer. The UE attempts to send one of the NAS message to the MM core network entity upon receiving the information about occurrence of an exceptional event even if the back-off timer is in running state. The MM core network entity processes the received NAS message. Sending, by the MM core network entity, an acceptance for the processed NAS message without including a back-off timer, to the UE as the request is due to an exceptional event. The running state of the CP back-off timer is managed at the UE in the absence of second CP back-off timer.

According to an embodiment of the present invention, the method further comprises sending, by UE, the NAS message with an indication that the control plane data is related to an exceptional event as part of packet header in the NAS message. Processing, by the MM core network entity, the received NAS message to identify that the data packet is related to exceptional event, said data is accepted and a priority treatment is provided even if network is congested or access point name (APN) rate control limit has reached or Serving PLMN Rate control limit has reached. Processing, by a packet gateway (PGW), the received data packets to identify that the data packet is related to exceptional event, said data is accepted and a priority treatment is provided even if PGW is congested or APN or Serving PLMN rate control limit has reached.

According to an embodiment of the present invention, the method further comprises identifying, by the UE, that UE is in one of an attempting to update state or attempting to attach state during one of running timer T3402 and timer T3411. Receiving by the UE, an information about occurrence of an exceptional event. Attempting by the UE, to send one of the ATTACH message and TAU message to the MM core network entity upon receiving the information about occurrence of an exceptional event.

According to an embodiment of the present invention, the NAS message comprises at least one of an attach request message, TAU request message, Control Plane (CP) Service Request message and Service request message. The exception event occurs comprises UE is allowed to send exception data as per UE and network configuration and UE wants to send a critical data for which the UE sets radio resource control (RRC) Establishment cause to mo-exception data to get priority in network side. The back-off timer comprises at least one of mobility management (MM) back-off timer, control plane (CP) data congestion back-off timer, and APN congestion back-off timer.

According to an embodiment of the present invention, it is possible to provide a method for handling control plane data especially exception data that is critical in a wireless network.

BRIEF DESCRIPTION OF THE DRAWINGS

The other objects, features and advantages will occur to those skilled in the art from the following description of the preferred embodiment and the accompanying drawings in which:

FIG. 1 is a schematic flow diagram illustrating transfer of control plane data using ESM data transport message, according to the prior art illustration.

FIG. 2 is a schematic flow diagram illustrating transfer of small data using ESM data transport message where release assistance indication IE is set to 01, according to an embodiment of the present invention.

FIG. 3 is a schematic flow diagram illustrating transfer of control plane data using ESM data transport message where release assistance indication IE is set to 02, according to an embodiment of the present invention.

FIG. 4 is a schematic flow diagram illustrating transfer of attach/TAU/Service Request/Control Plane Service Request message between UE and MME, according to the prior art illustration.

FIG. 5 is a schematic flow diagram illustrating dynamic handling of CP BO timer, according to an embodiment of the present invention.

FIG. 6 is a schematic flow diagram illustrating stopping of the CP BO timer value running on UE by network, according to an embodiment of the present invention.

FIGS. 7A and 7B are schematic flow diagrams illustrating exception data to be sent even when MM back off timer is running or UE has faced an abnormal situation, according to an embodiment of the present invention.

FIG. 8 is a schematic flow diagram illustrating that handling of exception data during network congestion situation, according to an embodiment of the present invention.

FIG. 9 is a schematic flow diagram illustrating transfer of exception data when UE faces abnormality, according to an embodiment of the present invention.

FIG. 10 is a schematic flow diagram illustrating transfer of exception data when UE is EMM is in connected mode, according to the prior art illustration.

FIG. 11 is a schematic flow diagram illustrating transfer of exception data when UE is EMM is in connected mode, according to an embodiment of the present invention.

Although specific features of the present invention are shown in some drawings and not in others. This is done for convenience only as each feature may be combined with any or all of the other features in accordance with the present invention.

DETAILED DESCRIPTION

The present invention claims benefit of the Indian Provisional Application No. 201641023071 titled "A METHOD AND SYSTEM FOR PROVIDING CELLULAR INTERNET OF THINGS (CIOT) OPTIMIZATION IN 3RD GENERATION PARTNERSHIP PROJECT TECHNICAL SPECIFICATION (3GPP TS)" by Samsung Electronics CO., LTD, filed on 5 Jul. 2016 and Indian Provisional Application No. 201641028365 titled "SYSTEM AND METHOD FOR CELLULAR INTERNET OF THINGS (CIOT) OPTIMIZATIONS" by Samsung Electronics CO., LTD, filed on 19 Aug. 2016 and Indian Provisional Application No. 201641033734 titled "OPTIMIZATION FOR HANDLING NB-IOT DEVICES" by Samsung Electronics CO., LTD, filed on 3 Oct. 2016, which is herein incorporated in its entirety by reference for all purposes.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

The various embodiments of the present invention disclose a method of handling control plane data in a wireless network. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a method of handling control plane data in a wireless network. The person having ordinarily skilled in the art can understand that the described embodiments use cases are for better understanding and illustration of the present invention, but not limit to scope of the present invention.

FIG. 1 is a schematic flow diagram illustrating transfer of control plane data using ESM data transport message, according to the prior art illustration. According to FIG. 1, user equipment (UE) 101 sends small data using ESM data transport message on control plane service request message to mobility management entity (MME) 102. MME is the core network mobility management entity. If MME 102 is congested for control plane (CP) data then the MME accepts the received control plane data and forwards the same to SCEF 103. MME 102 processes the data and due to control plane path congestion, MME 102 sends CP data back-off (BO) timer to UE 101 along with a service accept message. UE 101 starts CP back-off timer and does not send any data over control plane until CP BO timer is running.

FIG. 2 is a schematic flow diagram illustrating transfer of small data using ESM data transport message where release assistance indication IE is set to 01, according to an embodiment of the present invention. 3GPP specification has defined release assistance indication information elements (IE) in EPS session management (ESM) data transport message. Here EPS is evolved packet system. According to an embodiment of the present invention MME checks for IE in ESM Data Transport message. As per the Rel-14 of 3GPP specification the Release assistance indication IE is defined to be including only 2 values. Where Release assistance indication IE is set to 01 indicates that there is no further uplink or downlink data transmission is expected for the sent uplink data, according to an embodiment of the present invention. According to FIG. 2, UE 201 indicates in a release assistance indication IE in the Non-Access-Stratum (NAS) PDU that no further uplink or downlink data transmissions are expected. According to an embodiment of the present invention, the Release assistance indication IE value is set at 01. UE 201 sends the control plane service request with IE set at 01 in ESM data transport message to MME 202. MME 202 processes the received control plane data packet. After processing, MME 202 sends service accept message with control plane back-off timer to UE 201. On receiving service accept message, the UE 201 interprets this as successful transmission of the control plane data packet. UE 201 then starts the control plane back-off timer.

FIG. 3 is a schematic flow diagram illustrating transfer of control plane data using ESM data transport message where release assistance indication IE is set to 02, according to an embodiment of the present invention. If IE is set to 02 it indicates that there is only a single downlink data transmission (e.g. acknowledgement or response to uplink data) and no further uplink data transmission subsequent to the uplink data transmission is expected. According to FIG. 3, UE 301 indicates in a release assistance indication IE that UE 301 expects downlink data after sending control plane service request. According to an embodiment of the present invention, the IE value is set at 02. UE 301 sends the control plane service request with IE set at 02 in ESM data transport message to MME 302. However, MME 302 is overloaded and the service request is rejected. MME 302 decides not to process the received control plane data packet and sends service reject message with control plane back-off timer to UE 301. On receiving service reject message, the UE 301 interprets this as unsuccessful transmission of the control plane data packet. UE 301 then starts the control plane back-off timer.

According to an embodiment of the present invention, based on release assistance indication (RAI) IE value in ESM data transport message, network determines whether to accept the CP data or reject it. In case RAI is 1 then service accept is sent to UE and indicates to UE that MME has successfully processed the CP data however control plane (CP) back-off (BO) timer is provided so that UE shall not again initiate CP data till CP BO timer expires. In case RAI is 2 then service reject is sent to UE and indicates to UE that MME is congested for CP data and sent data packet is not processed successfully by network. Further CP BO timer is provided so that UE shall not again initiate CP data till CP BO timer expires.

FIG. 4 is a schematic flow diagram illustrating transfer of attach/TAU/Service Request/Control Plane Service Request message between UE and MME, according to the prior art illustration. According to FIG. 4, UE 401 has received control plane back-off timer in service accept message and CP back-off timer is running. UE 401 triggers NAS message such as Attach/TAU request/CP service request message and is sent to MME 402. MME 402 then sends Attach/TAU accept/Service accept message to UE 401. The CP back-off timer keeps on running in UE 401 and there is no impact on the CP back-off timer state due to network signaling. The network is unable to change control plane back-off timer value which is running in UE 401 and also cannot indicate its congestion alleviated situation if there is no MT data packet.

FIG. 5 is a schematic flow diagram illustrating dynamic handling of CP BO timer, according to an embodiment of the present invention. According to FIG. 5, dynamic handling of control plane (CP) back-off (BO) timer is illustrated. According to an embodiment of the present invention, UE 501 has received control plane back-off timer in service accept message and CP back-off timer is running. UE 501 triggers Attach/TAU/Service request message and is sent to MME 502. MME 502 then sends a new timer value in Attach/TAU accept/Service Accept/Service Reject message to UE 501. On receiving the new timer value UE 501 shall stop the CP back-off timer that is running and restart the timer again with new value received from the network.

FIG. 6 is a schematic flow diagram illustrating stopping of the CP BO timer value running on UE by network, according to an embodiment of the present invention. According to FIG. 6, stopping of the CP BO timer value running on UE by network is illustrated. According to an embodiment of the present invention, UE 601 has received control plane back-off timer in service accept message and CP back-off timer is running. UE 601 triggers Attach/TAU/CP Service request message and is sent to MME 602. MME 602 then sends Attach/TAU/Service Accept message to UE 601 without including CP BO timer value IE. After which UE 601 stops the running timer as the timer value IE is not received from the network.

FIGS. 7A and 7B are schematic flow diagrams illustrating exception data to be sent even when MM back off timer is running or UE has faced an abnormal situation, according to an embodiment of the present invention. According to an embodiment of the present invention, exception data is sent by UE even when MM back off timer is running. An application processor (AP) requests for an exceptional event, the communication processor (CP) in UE then initiates TAU or Attach procedure if it's in NOT UPDATED (Attempting to UPDATE or Attempting to Attach etc.) state even if timer is running (as shown FIG. 7A). In another embodiment of the present invention, the application processor (AP) requests for an exceptional event, the communication processor (CP) in UE then initiates control plane service request procedure if it's in UPDATED state irrespective of whether timer is running (as shown FIG. 7B).

FIG. 8 is a schematic flow diagram illustrating that handling of exception data during network congestion situation, according to an embodiment of the present invention. According to FIG. 8, the application processor (AP) 801 in UE requests to send exception data. The communication processor (CP) 801 in UE sends NAS message to MME 802 with RRC establishment cause not set to mo-exception data. MME 802 sends corresponding NAS reject with back-off timer to UE 801. The UE 801 will not be allowed to send data or signaling as long as back-off timer is running. Here back-off timer is started when RRC Establishment cause was not set to mo-exception data. If exception data is generated, even though back-off timer is running exception data could be sent. The UE 801 again sends NAS message to MME 802 with RRC establishment cause set to mo-exception data. MME 802 sends corresponding NAS reject with back-off timer to UE 801. The UE 801 will not be allowed to send even exception data as long as back-off timer is running.

FIG. 9 is a schematic flow diagram illustrating transfer of exception data when UE faces abnormality, according to an embodiment of the present invention. According to the present invention, if UE 902 faces abnormality and gets into attempting to update state or attempting to attach state, then UE 902 should be allowed to initiate Attach or TAU procedure to send exception data. The UE 902 shall initiate Attach or TAU procedure if it's in NOT UPDATED (Attempting to UPDATE or Attempting to Attach etc.) state.

FIG. 10 is a schematic flow diagram illustrating transfer of exception data when UE is EMM is in connected mode, according to the prior art illustration. According to FIG. 10, UE 1001 is in connected mode and sends ESM data transport message to network 1002. The network 1002 has no information whether the received data PDU is normal data or exception data. Therefore the network provides same treatment to any kind of data that is being received. If APN rate control or SPLMN rate control limit is reached or network is congested, packet will be dropped.

FIG. 11 is a schematic flow diagram illustrating transfer of exception data when UE is EMM is in connected mode, according to an embodiment of the present invention. According to FIG. 11, UE 1101 is in connected mode and sends ESM data transport message along with an indication that it is carrying exception data to network 1102. The network 1102 provides priority treatment to the exception data. The ESM data transport message is processed by the network 1102 even though APN rate control or serving PLMN rate control limit is reached or network is congested.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method performed by a mobility management entity (MME) in a wireless communication system, the method comprising:
    receiving, from a terminal, a non-access stratum (NAS) message including a release assistance indication (RAI) indicating whether no further transmission of uplink data or downlink data subsequent to an uplink data transmission is expected;
    determining a control plane being congested, upon receipt of the NAS message; and
    transmitting, to the terminal, a response message for the NAS message based on the RAI, the response message including a value of a back-off timer.

2. The method as claimed in the claim 1,
wherein the response message is an accept message, in case that the RAI is set to no further transmission of uplink data or downlink data subsequent to the uplink data transmission being expected.

3. The method as claimed in the claim 1, wherein the response message is a reject message, in case that the RAI is not set to no further transmission of uplink data or downlink data subsequent to the uplink data transmission being expected.

4. The method as claimed in the claim 1 further comprising:
receiving, from the terminal, a request message based on an idle state of the terminal; and
transmitting, to the terminal, an accept message for the request message without the value of the back-off timer,
wherein the back-off timer run in the terminal is stopped, based on the accept message without the value of the back-off timer.

5. The method as claimed in the claim 1, wherein the NAS message is a control plane service request message piggybacked with an evolved packet system (EPS) session management (ESM) data transport message, and
wherein the back-off timer is a control plane data congestion back-off timer.

6. A mobility management entity (MME) in a wireless communication system, comprising:
a transceiver; and
at least one controller coupled to the transceiver and configured to:
control the transceiver to receive, from a terminal, a non-access stratum (NAS) message including a release assistance indication (RAI) indicating whether no further transmission of uplink data or downlink data subsequent to an uplink data transmission is expected,
determine a control plane being congested, upon receipt of the NAS message, and
control the transceiver to transmit, to the terminal, a response message for the NAS message based on the RAI, the response message including a value of a back-off timer.

7. The MME as claimed in the claim 6, wherein the response message is an accept message, in case that the RAI is set to no further transmission of uplink data or downlink data subsequent to the uplink data transmission being expected.

8. The MME as claimed in the claim 6, wherein the response message is a reject message, in case that the RAI is not set to no further transmission of uplink data or downlink data subsequent to the uplink data transmission being expected.

9. The MME as claimed in the claim 6, wherein the at least one controller is further configured to: control the transceiver to receive, from the terminal, a request message based on an idle state of the terminal, and control the transceiver to transmit, to the terminal, an accept message for the request message without the value of the back-off timer, and
wherein the back-off timer run in the terminal is stopped, based on the accept message without the value of the back-off timer.

10. The MME of as claimed in the claim 6, wherein the NAS message is a control plane service request message piggybacked with an evolved packet system (EPS) session management (ESM) data transport message, and
wherein the back-off timer is a control plane data congestion back-off timer.

11. A method performed by a terminal in a wireless communication system, the method comprising:
transmitting, to a mobility management entity (MME), a non-access stratum (NAS) message including a release assistance indication (RAI) indicating whether no further transmission of uplink data or downlink data subsequent to an uplink data transmission is expected; and
receiving, from the MME, a response message for the NAS message including a value of a back-off timer,
wherein the response message is transmitted based on the RAI, in case that a control plane being congested is determined by the MME.

12. The method as claimed in the claim 11, wherein the response message is an accept message, in case that the RAI is set to no further transmission of uplink data or downlink data subsequent to the uplink data transmission being expected.

13. The method as claimed in the claim 11, wherein the response message is a reject message, in case that the RAI is not set to no further transmission of uplink data or downlink data subsequent to the uplink data transmission being expected.

14. The method as claimed in the claim 11, further comprising:
starting the back-off timer based on the value;
transmitting, to the MME, a request message based on an idle state of the terminal;
receiving, from the MME, an accept message for the request message; and
stopping the back-off timer, in case that the accept message does not include the value of the back-off timer.

15. The method as claimed in the claim 11, wherein the NAS message is a control plane service request message piggybacked with an evolved packet system (EPS) session management (ESM) data transport message, and
wherein the back-off timer is a control plane data congestion back-off timer.

16. A terminal in a wireless communication system, comprising:
a transceiver; and
at least one controller coupled to the transceiver and configured to:
control the transceiver to transmit, to a mobility management entity (MME), a non-access stratum (NAS) message including a release assistance indication (RAI) indicating whether no further transmission of uplink data or downlink data subsequent to an uplink data transmission is expected, and
control the transceiver to receive, from the MME, a response message for the NAS message including a value of a back-off timer,
wherein the response message is transmitted based on the RAI, in case that a control plane being congested is determined by the MME.

17. The terminal as claimed in the claim 16, wherein the response message is an accept message, in case that the RAI is set to no further transmission of uplink data or downlink data subsequent to the uplink data transmission being expected.

18. The terminal as claimed in the claim 16, wherein the response message is a reject message, in case that the RAI is not set to no further transmission of uplink data or downlink data subsequent to the uplink data transmission being expected.

19. The terminal as claimed in the claim 16, wherein the at least one controller is further configured to: start the back-off timer based on the value, control the transceiver to transmit, to the MME, a request message based on an idle state of the terminal, control the transceiver to receive, from the MME, an accept message for the request message, and stop the back-off timer, in case that the accept message does not include the value of the back-off timer.

20. The terminal as claimed in the claim 16, wherein the NAS message is a control plane service request message piggybacked with an evolved packet system (EPS) session management (ESM) data transport message, and wherein the back-off timer is a control plane data congestion back-off timer.

\* \* \* \* \*